(12) United States Patent
Kakishita

(10) Patent No.: US 12,374,712 B2
(45) Date of Patent: Jul. 29, 2025

(54) ELECTRODE BODY PRODUCING APPARATUS

(71) Applicant: Prime Planet Energy & Solutions, Inc., Tokyo (JP)

(72) Inventor: Kenichi Kakishita, Okazaki (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 552 days.

(21) Appl. No.: 17/719,370

(22) Filed: Apr. 13, 2022

(65) Prior Publication Data
US 2022/0352538 A1    Nov. 3, 2022

(30) Foreign Application Priority Data

Apr. 28, 2021  (JP) ................................. 2021-076263
Mar. 22, 2022  (JP) ................................. 2022-045693

(51) Int. Cl.
  *H01M 10/04*  (2006.01)
  *H01M 10/0585*  (2010.01)

(52) U.S. Cl.
  CPC ... *H01M 10/0404* (2013.01); *H01M 10/0413* (2013.01); *H01M 10/0468* (2013.01); *H01M 10/0585* (2013.01)

(58) Field of Classification Search
  CPC ......... H01M 10/0413; H01M 10/0468; H01M 10/0585; H01M 4/043; Y02E 60/10; Y02P 70/50
  See application file for complete search history.

(56) References Cited

U.S. PATENT DOCUMENTS

| | | | |
|---|---|---|---|
| 2014/0020235 A1* | 1/2014 | Aramaki | H01M 4/139 29/730 |
| 2014/0026398 A1* | 1/2014 | Watanabe | H01M 10/052 29/730 |
| 2014/0027067 A1* | 1/2014 | Yuhara | H01M 10/0404 156/580 |
| 2014/0033883 A1* | 2/2014 | Yuhara | B65H 29/241 83/156 |

(Continued)

FOREIGN PATENT DOCUMENTS

| | | | |
|---|---|---|---|
| JP | 2002016346 A | * | 1/2002 |
| JP | 2017-130271 A | | 7/2017 |

(Continued)

*Primary Examiner* — Jeffrey T Carley
*Assistant Examiner* — Jose K Abraham
(74) *Attorney, Agent, or Firm* — HAUPTMAN HAM, LLP

(57) ABSTRACT

An electrode body producing apparatus is provided with a rotary base body, stacking table portions provided on its outer peripheral end portion, and a workpiece transferring section to transfer an unplaced workpiece on an object placement surface of a post-placed laminated body and others. A height adjusting portion of the stacking table portion changes a radial height of a table surface so that a radial height of the object placement surface becomes a predetermined radial height at least at a workpiece transferring angular position, and the workpiece transferring section transfers and places the unplaced workpiece on the object placement surface in synchronization with rotation movement of the object placement surface at the workpiece transferring angular position.

6 Claims, 6 Drawing Sheets

(56) References Cited

U.S. PATENT DOCUMENTS

| | | | | |
|---|---|---|---|---|
| 2014/0059855 A1* | 3/2014 | Miyazaki | ............... | H01R 43/16 29/874 |
| 2014/0109396 A1* | 4/2014 | Hirai | ................. | H01M 10/0404 29/730 |
| 2015/0020380 A1* | 1/2015 | Yamaura | ............... | H01M 6/005 29/730 |
| 2019/0036149 A1* | 1/2019 | Sakurai | ................. | H01M 50/46 |
| 2020/0044273 A1 | 2/2020 | Abe | | |
| 2020/0127317 A1* | 4/2020 | Lee | ................... | H01M 10/0459 |
| 2020/0153026 A1* | 5/2020 | Abe | ........................ | B23K 20/26 |
| 2020/0373606 A1* | 11/2020 | Kamigawa | ........ | H01M 10/0404 |
| 2021/0184240 A1 | 6/2021 | Yamashita | | |
| 2021/0202976 A1 | 7/2021 | Abe | | |

FOREIGN PATENT DOCUMENTS

| | | | |
|---|---|---|---|
| JP | 2019200926 A | 11/2019 |
| JP | 2019215977 A | 12/2019 |
| JP | 202024816 A | 2/2020 |

* cited by examiner ns of US 12,374,712 B2

ELECTRODE BODY PRODUCING APPARATUS

CROSS-REFERENCE TO RELATED APPLICATIONS

This application is based upon and claims the benefit of priority from the prior Japanese Patent Applications No. 2021-076263, filed Apr. 28, 2021 and No. 2022-045693, filed Mar. 22, 2022, the entire contents of which are incorporated herein by reference.

BACKGROUND

Technical Field

The present disclosure relates to an electrode body producing apparatus to produce a laminated electrode body formed by stacking a plurality of workpieces.

Related Art

As an electrode body constituting a battery and a capacitor, a laminated electrode body in which a plurality of electrode plates are laminated has been known. As one example, there is provided a laminated electrode body formed in a manner that a plurality of rectangular positive electrode plates and a plurality of rectangular negative electrode plates are laminated alternately with rectangular separators interposed therebetween. Further, an electrode body producing apparatus for producing the above-configured laminated electrode body has been known and disclosed in JP Patent Application Publication No. 2019-200926, for example.

An electrode body producing apparatus ("a battery material stacking apparatus" in JP 2019-200926A) according to JP2019-200926A is provided with a "feeding mechanism" to feed workpieces, a "rotary body", a plurality of "holding portions" provided on a peripheral edge portion of the rotary body so as to be rotated and moved in association with the rotary body, and a "stacking table" placed on a predetermined position (see FIG. 1, claims 1 and 2, and others in JP 2019-200926A). In this apparatus, the workpieces are firstly transferred from the feeding mechanism to the holding portions provided on the peripheral edge portion of the rotary body, and the rotary body is rotated by a half rotation so that each of the holding portions are moved to approach the stacking table that has been placed at a predetermined position. Then, each of the holding portions is temporarily stopped with respect to the stacking table to transfer the workpiece to the stacking table from the holding portion. This operation has been repeated to stack a plurality of the workpieces on the stacking table so that the laminated-type electrode body is formed.

SUMMARY

Technical Problems

However, in the above apparatus, while the holding portions are rotated and moved in association with the rotary body, the stacking table is held at a predetermined fixed position. Accordingly, when the workpieces are to be transferred from the holding portions to the stacking table, the holding portions rotated and moved with the rotary body and the workpieces held thereby are temporarily stopped. This makes it difficult to appropriately transfer the workpieces from the holding portions to the stacking table for appropriately stacking the workpieces to form the laminated electrode body. Especially when a rotation speed of the rotary body is increased more and more for the purpose of increasing the productivity of the laminated electrode body, the holding portions that have been rotated and moved at high speed needs to be suddenly stopped, so that it is difficult to transfer the workpieces from the holding portions to the stacking table in an appropriate manner and to stack the workpieces appropriately for forming the laminated electrode body.

The present disclosure has been made in view of the above circumstances and has a purpose of providing an electrode body producing apparatus achieving producing of a laminated electrode body by stacking workpieces in an appropriate manner.

Means of Solving the Problems

One aspect of the present disclosure to solve the above problem is an electrode body producing apparatus configured to produce a laminated electrode body formed by stacking a plurality of workpieces, the electrode body producing apparatus comprising: a rotary base body of a cylindrical shape configured to rotate about a rotary axis; a plurality of stacking table portions provided on an outer peripheral edge portion of the rotary base body to rotate and move with the rotary base body; a workpiece transferring section configured to transfer an unplaced workpiece that is held by the workpiece transferring section on an object placement surface of any one of a table surface of the respective stacking table portions and a radial outer surface of a post-placed laminated body which is held to the table surface, wherein each of the stacking table portions comprises a height adjusting portion configured to change a radial height of the table surface, the height adjusting portion is configured, at least at a workpiece transferring angular position on which the unplaced workpiece is transferred from the workpiece transferring section to the stacking table portion, to change the radial height of the table surface such that a radial height of the object placement surface becomes a predetermined radial height, and the workpiece transferring section is configured to transfer and place the unplaced workpiece on the object placement surface in synchronization with rotation movement of the object placement surface at the workpiece transferring angular position.

In the above-mentioned electrode body producing apparatus, the stacking table portions are provided on the outer peripheral edge portion of the rotary base body. Each of the stacking table portions includes the height adjusting portion to adjust or change the radial height of the table surface, and the height adjusting portion changes the radial height of the table surface at least at the workpiece transferring angular position so that the radial height of the object placement surface of the post-placed laminated body and others becomes the predetermined radial height. Thus, by every one rotation of the rotary base body, the unplaced workpieces which is to be placed can be transferred from the workpiece transferring section to the stacking table portions one by one, so that a laminated electrode body formed of a predetermined number (n) of post-placed workpieces can be easily formed by rotating the rotary base body by a predetermined number of times (n times rotation).

Further, in the above electrode body producing apparatus, the unplaced workpiece is transferred and placed on the object placement surface in synchronization with rotation movement of the object placement surface of the post-placed laminated body and others at the workpiece transferring angular position, so that the laminated electrode body can be appropriately produced by stacking the unplaced workpieces on the stacking table portion.

Herein, the "laminated electrode body" is an electrode body configuring a secondary battery such as a lithium-ion secondary battery and a power storage device such as an electric double-layer capacitor and a lithium-ion capacitor. As the laminated electrode body, for example, there are given a laminated electrode body formed in a manner that a plurality of positive electrode plates and a plurality of negative electrode plates are alternately laminated with separators or solid electrolyte layers interposed therebetween and a laminated electrode body formed in a manner that a plurality of bipolar electrode plates (an electrode plate having one main surface of a current collecting foil formed with a positive active material layer and the other main surface formed with a negative active material layer) are laminated with separators or solid electrolyte layers interposed therebetween.

As a "workpiece," for example, there are given a workpiece formed of one electrode plate or one separator or one solid electrolyte layer, a workpiece formed of a so-called mono cell which is formed by laminating and integrating a positive electrode plate, a separator (or a solid electrolyte layer), a negative electrode plate, and the separator (or the solid electrolyte layer) in advance in this order, and a workpiece formed of an electrode plate provided with separators (an electrode plate provided with solid electrolyte layers) formed in a manner that the separator (or the solid electrolyte layer), the electrode plate, and the separator (or the solid electrolyte layer) are laminated and integrated in advance in this order. Further, the workpieces may not be the identical shape to one another. For example, the workpiece constituting one end portion in a stacking direction of the laminated electrode body or another workpiece constituting the other end portion may be of a different shape from a workpiece constituting an intermediate portion other than those end portions in the stacking direction.

As a method of holding the post-placed laminated body placed on the table surface of the stacking table portion, for example, there is given a method of sucking and holding the post-placed laminated body on the table surface by suction. When this method is to be adopted, the post-placed workpieces configuring the post-placed laminated body may be bonded and integrated by a bonding agent, for example. Specifically, an unplaced workpiece which is to be newly stacked or a radial outer surface (an object placement surface) of a post-placed laminated body is applied with a bonding agent in advance, and then the unplaced workpiece may be stacked and bonded to the post-placed laminated body. Further, it is preferable to make the rotation speed of the rotary body the constant speed since increase or decrease in rotational energy can be made less, but alternatively, the rotation speed may be changed.

Further, another method is that the radial outer surface of the post-placed laminated body that has been placed on the table surface is engaged by an engagement member such as a plurality of claws and pulled toward a radially inner side to hold the post-placed laminated body to the table surface.

Further, another method is that the post-placed laminated body on the table surface is pressed against the table surface on the radially inner side by a belt and the belt is moved together in association with rotation movement of the post-placed laminated body so that the post-placed laminated body is held to the table surface.

In the above methods, the post-placed workpieces configuring the post-placed laminated body may not be bonded and integrated, or the post-placed workpieces may be integrated by bonding.

Further, in the above-mentioned electrode body producing apparatus, preferably, the electrode body producing apparatus comprises an electrode body transferring section configured to transfer the laminated electrode body, which has been completed, from the stacking table portions, the electrode body transferring section comprises an electrode body receiving portion configured to receive the laminated electrode body, and the electrode body transferring section is configured to transfer and receive the laminated electrode body, which has been separated from the stacking table portion, by the electrode body receiving portion at an equal speed with rotation movement of a radial outer top face of the laminated electrode body at an electrode body transferring angular position on which the laminated electrode body is transferred from the respective stacking table portions to the electrode body receiving portion as well as at a discharging timing of discharging the laminated electrode body.

The above-mentioned electrode body producing apparatus is further provided with the electrode body transferring section including the electrode body receiving portion. At the above-mentioned electrode body transferring angular position as well as at the discharging timing, the laminated electrode body that has been separated from the stacking table portion is moved and received by the electrode body receiving portion at the equal speed with the rotation movement of the radial outer top face of the laminated electrode body. In this manner, the laminated electrode body can be transferred smoothly to the electrode body receiving portion with less impact and appropriately discharged outside the apparatus.

Further, as a method of separating the laminated electrode body from the stacking table portion, for example, there is given a method of separating the laminated electrode body by stopping the suction when the laminated electrode body is sucked and held to the table surface by sucking.

Further, there is given a method of separating the laminated electrode body by releasing the engagement by the engagement member when the laminated electrode body is engaged with the engagement member to be pulled and held to the table surface on the radially inner side.

Further, there is given a method of separating the laminated electrode body by moving the belt to stop pressing by the belt when the laminated electrode body is pressed and held to the table surface on the radially inner side by the belt.

As the "electrode body receiving portion," for example, a feeding belt bridged over a plurality of feeding rollers and a leading end portion of a robotic arm configured to hold the laminated electrode body can be given.

DETAILED DESCRIPTION OF THE EXEMPLARY EMBODIMENTS

Embodiment

Figure 1:
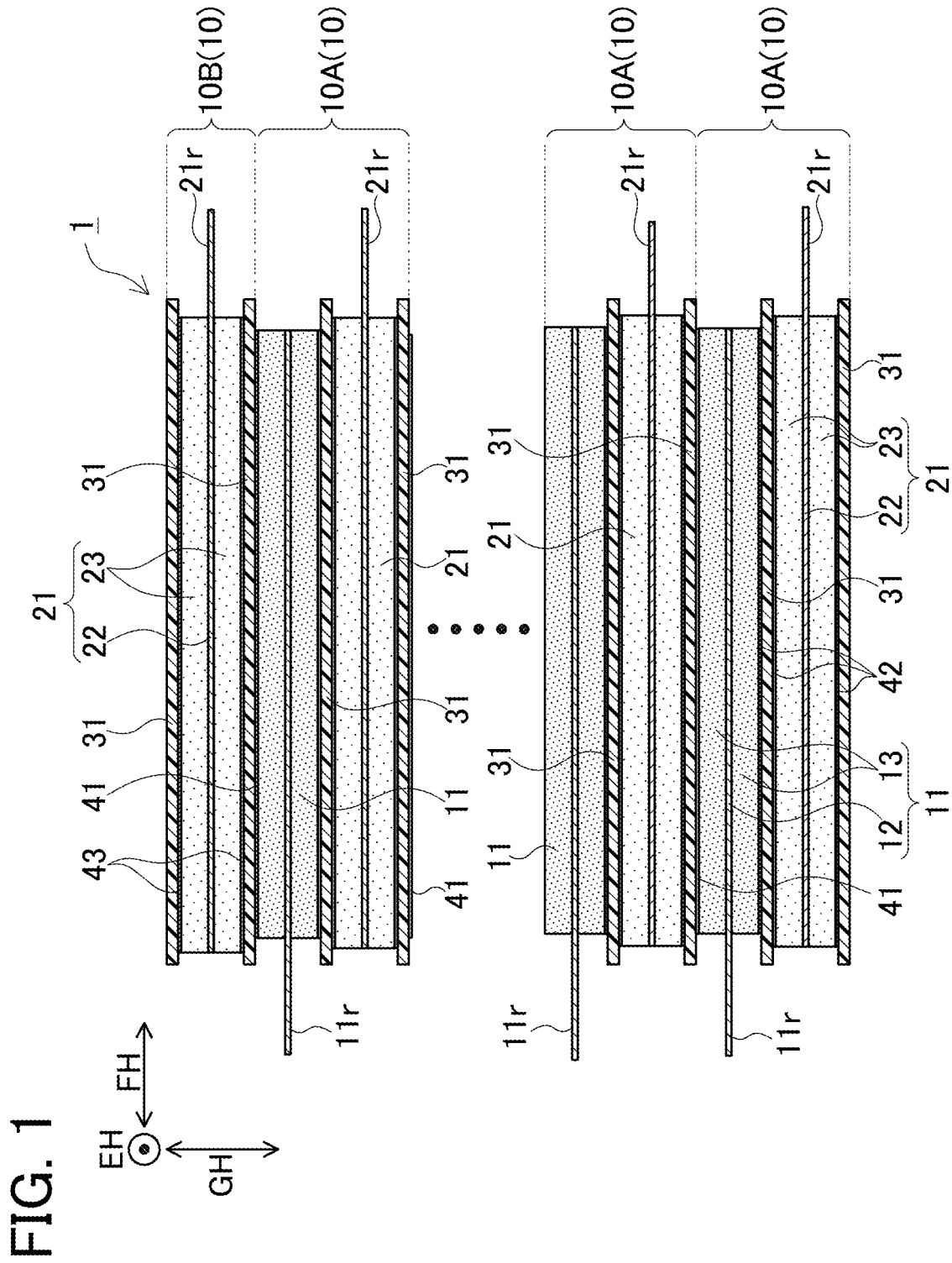
FIG. 1 is a sectional view of a laminated electrode body in an embodiment.
Figure 2:
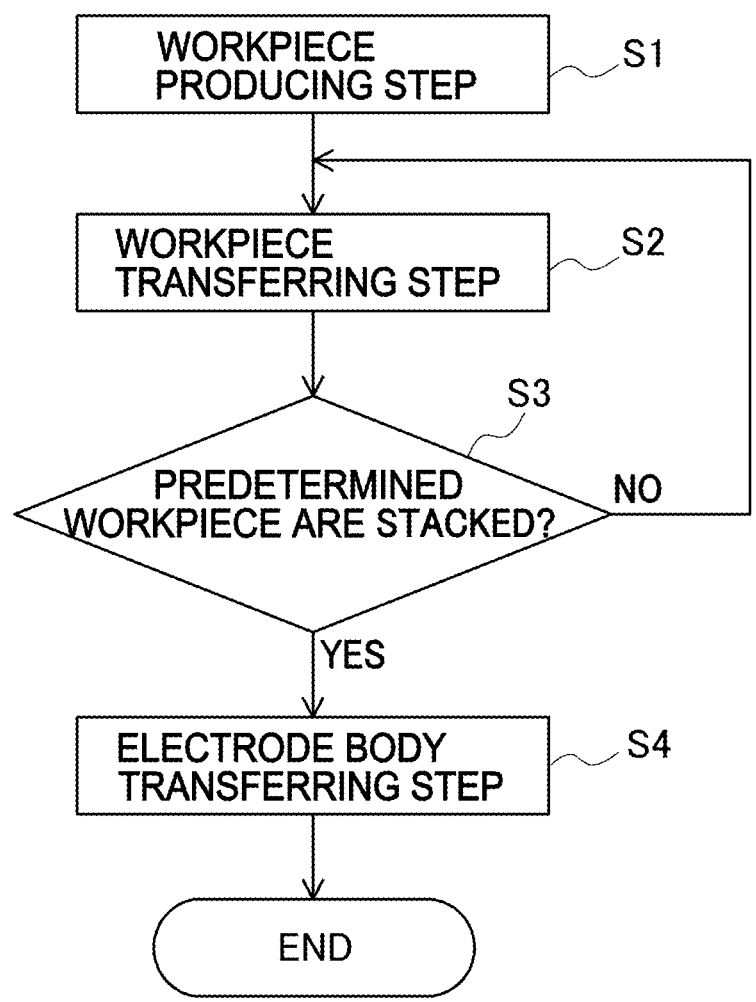
FIG. 2 is a flowchart showing a producing method of the laminated electrode body in the embodiment.

An embodiment of the present disclosure is now explained below with reference to the accompanying drawings. FIG. 1 is a schematic sectional view of a laminated electrode body 1 according to the present embodiment. The following explanation is made with defining a vertical direction EH, a lateral direction FH, and a thickness direction (a laminating direction) GH of the laminated electrode body 1 as indicated in FIG. 1, respectively. This laminated electrode body 1 is used for a rectangular parallel-piped hermetically sealed lithium-ion secondary battery (not shown) mounted on a vehicle such as a hybrid vehicle, a plug-in hybrid vehicle, and an electric vehicle.

The laminated electrode body 1 is an electrode body of a rectangular parallel-piped shape and is formed in a manner that a plurality of rectangular positive electrode plates (electrode plates) 11 and a plurality of rectangular negative electrode plates (electrode plates) 21 are alternately laminated with rectangular separators 31 made of porous resin films interposed therebetween. This laminated electrode body 1 is, as mentioned below, formed by stacking workpieces 10 in the thickness direction GH by a plurality of steps (in the present embodiment, the number of steps n is ten) and integrating the adjacent workpieces 10 via first bonding layers 41.

Among the ten workpieces 10 configuring the laminated electrode body 1 with the number of steps n of ten, in FIG. 1, nine first workpieces 10A other than a second workpiece 10B positioned on a topmost step are each formed of a mono cell as a workpiece formed by laminating and integrating the positive electrode plate 11, the separator 31, the negative electrode plate 21, and the separator 31 in this order with second bonding layers 42 interposed therebetween. On the other hand, the second workpiece 10B on the topmost step is a negative electrode plate with a separator and is a workpiece formed by laminating and integrating the negative electrode plate 21 with the separators 31 bonded on both main surfaces of the negative electrode plate 21 via third bonding layers 43, respectively.

The positive electrode plate 11 is formed of a positive current collecting foil 12 made of a rectangular aluminum foil and positive active material layers 13 each formed on both main surfaces of this positive current collecting foil 12. These positive active material layers 13 are each configured with positive active material particles that can occlude and release lithium ions, conductive particles, and a binder. In the positive electrode plate 11, an end portion extending in the vertical direction EH (a direction orthogonal to a paper surface in FIG. 1) on one side in the lateral direction FH (a left side in FIG. 1) is a positive electrode exposed portion 11r in which the positive current collecting foil 12 is exposed in the thickness direction GH with no existence of the positive active material layer 13 in the thickness direction GH.

The negative electrode plate 21 is formed of a negative current collecting foil 22 made of a rectangular copper foil and negative active material layers 23 each formed on both main surfaces of the negative current collecting foil 22. The negative active material layers 23 are each configured with negative active material particles, which can occlude and release lithium ions, and a binder. In the negative electrode plate 21, an end portion extending in the vertical direction EH on the other side in the lateral direction FH (a right side in FIG. 1) is a negative electrode exposed portion 21r in which the negative current collecting foil 22 is exposed in the thickness direction GH with no existence of the negative active material layer 23 in the thickness direction GH.

Next, a producing method of the above-mentioned laminated electrode body 1 is explained (see FIG. 2 to FIG. 6). In a "workpiece producing step S1" (see FIG. 2), firstly, the workpiece 10 is produced.

The positive electrode plate 11 and the negative electrode plate 21 are firstly produced. Specifically, a positive active material paste obtained by mixing the positive active material particles, the conductive particles, the binder and disperse medium is applied onto the one main surface of the positive current collecting foil 12 to form a positive active material layer to be dried (not shown), and subsequently, this positive active material layer to be dried is heated and dried to form the positive active material layer 13. Further, the other main surface of the positive current collecting foil 12 is also similarly formed with the positive active material layer 13. Then, the positive active material layers 13 are compressed by roll pressing and thus the positive electrode plate 11 is produced. Further, a negative active material paste obtained by mixing the negative active material particles, the binder, and the disperse medium is applied on one main surface of the negative current collecting foil 22 to form a negative active material layer to be dried (not shown), and thereafter, this negative active material layer to be dried is heated and dried to form the negative active material layer 23. Further, the other main surface of the negative current collecting foil 22 is also similarly formed with the negative active material layer 23. The negative active material layers 23 are then compressed by roll pressing and the negative electrode plate 21 is produced. Separately, the separators 31 are prepared.

Subsequently, the first workpiece 10A (mono cell) is formed by laminating and integrating the positive electrode plate 11, the separator 31, the negative electrode plate 21, and the separator 31 in this order with the second bonding layers 42 interposed therebetween. On the other hand, the second workpiece 10B (the negative electrode plate with the separator) is formed by laminating and integrating the separator 31, the negative electrode plate 21, and the separator 31 in this order with the third bonding layers 43 interposed therebetween.

After that, a "workpiece transferring step S2," a "determination step S3," and an "electrode body transferring step S4" (see FIG. 2) are performed. These workpiece transferring step S2 to the electrode plate transferring step S4 are performed by use of an electrode body producing apparatus 100 (see FIG. 3 to FIG. 6). This electrode body producing apparatus 100 includes a rotary base body 110 of a cylindrical shape, a plurality of (in the present embodiment, eight pieces of) stacking table portions 120 provided on an outer peripheral edge portion 110s of the rotary base body 110 to be rotated and moved with the rotary base body 110, a workpiece transferring section 140 to transfer unplaced workpieces 10P to the stacking table portions 120, an adhesive agent applying section 160 to apply an adhesive agent 41Z to the unplaced workpieces 10P, an electrode body transferring section 170 to transfer the completed laminated electrode body 1 from the stacking table portions 120, and a controller 190. The unplaced workpieces herein represent workpieces which are to be placed on an object placement surface hsm explained below.

Figure 3:
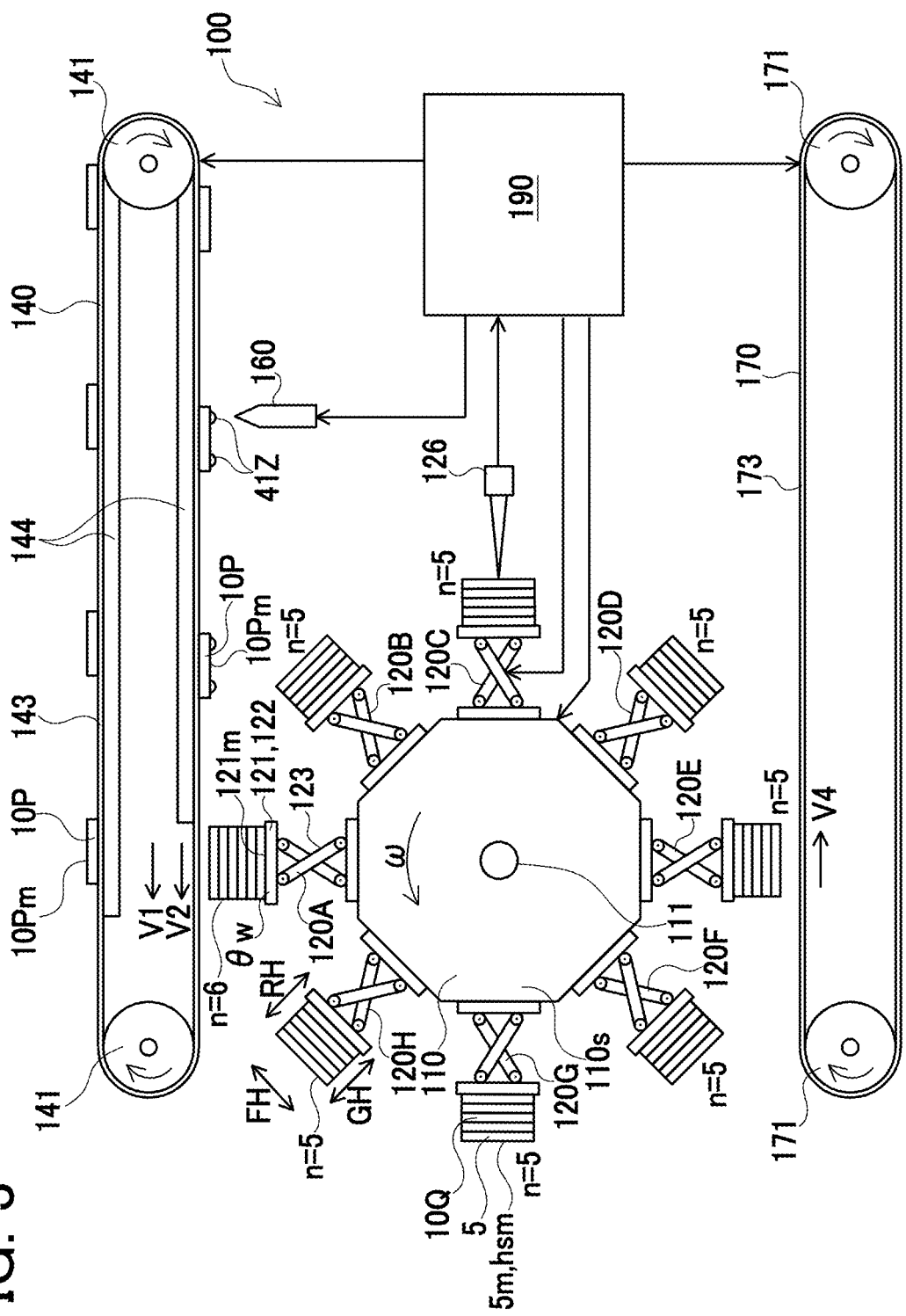
FIG. 3 is an explanatory view of an electrode body producing apparatus in the embodiment.

Among those elements, the rotary base body 110 includes a rotary shaft 111 connected to a motor (not shown) so as to be rotated in a counter-clockwise direction in FIG. 3 about the rotary shaft 111 at a constant speed (a constant angular velocity $\omega$).

Each of the stacking table portions 120 (a first stacking table portion 120A to an eighth stacking table portion 120H) (see also FIG. 4) includes an adsorption table 121 of rectangular shape including a rectangular table surface 121*m* and a height adjusting portion 123 to adjust or change a radial height Ht (a radial height Ht from the outer peripheral edge portion 110*s* of the rotary base body 110) of the table surface 121*m* by moving this adsorption table 121 in a radial direction RH of the rotary base body 110. Among these elements, the adsorption table 121 includes a suction mechanism 122 allowed to adsorb a post-placed laminated body 5 to the table surface 121*m* by sucking.

The height adjusting portion 123 is configured with an X-linkage mechanism 124 connected to the adsorption table 121, a servomotor 125 to drive the X-linkage mechanism 124 in the radial direction RH, a height detection sensor 126 to detect a radial height Hs (the radial height Hs from the outer peripheral edge portion 110*s* of the rotary base body 110) of the object placement surface hsm (hereinafter, referred as the object placement surface hsm of the post-placed laminated body 5 and others or simply as the object placement surface hsm) which is constituted as the table surface 121*m* of the stacking table portion 120 (on which no post-placed laminated body 5 is placed) or a radial outer surface 5*m* of the post-placed laminated body 5 which has already been placed on the table surface 121*m*, and the controller 190 to control the servomotor 125 based on information from the height detection sensor 126. Specifically, the height detection sensor 126 is disposed on a right side (at an angular position corresponding to a three-o'clock position of an analog clock) in FIG. 3 with respect to the rotary shaft 111 of the rotary base body 110, and when the stacking table portion 120 to be rotated and moved with the rotary base body 110 passes the three-o'clock angular position, the height detection sensor 126 detects the radial height Hs from the object placement surface hsm of the post-placed laminated body 5 and others.

After that, by the time when this stacking table portion 120 reaches a workpiece transferring angular position θw (in the present embodiment, a topmost position (an angular position corresponding to a twelve-o'clock position of the analog clock) in FIG. 3) with respect to the rotary shaft, which means a period of time while the stacking table portion 120 is rotated by 90 degrees in the present embodiment, the controller 190 controls to drive the servomotor 125 based on the information of the height detection sensor 126 to adjust the radial height Ht of the table surface 121*m* such that the radial height Hs from the object placement surface hsm of the post-placed laminated body 5 and others becomes the predetermined radial height Hsc (Hs=Hsc). Thus, by the time when the stacking table portion 120 reaches the workpiece transferring angular position θw, the radial height Hs of the object placement surface hsm of the post-placed laminated body 5 and others becomes the predetermined radial height Hsc. Accordingly, in any one of the stacking table portions 120 (120A to 120H), or by any number of steps the workpieces 10 are stacked on the table surface 121*m*, a peripheral speed (a transferring speed V2) of the object placement surface hsm of the post-placed laminated body 5 and others (before the next pre-placement workpiece 10P is newly transferred) is made equal at the workpiece transferring angular position θw.

Figure 4:
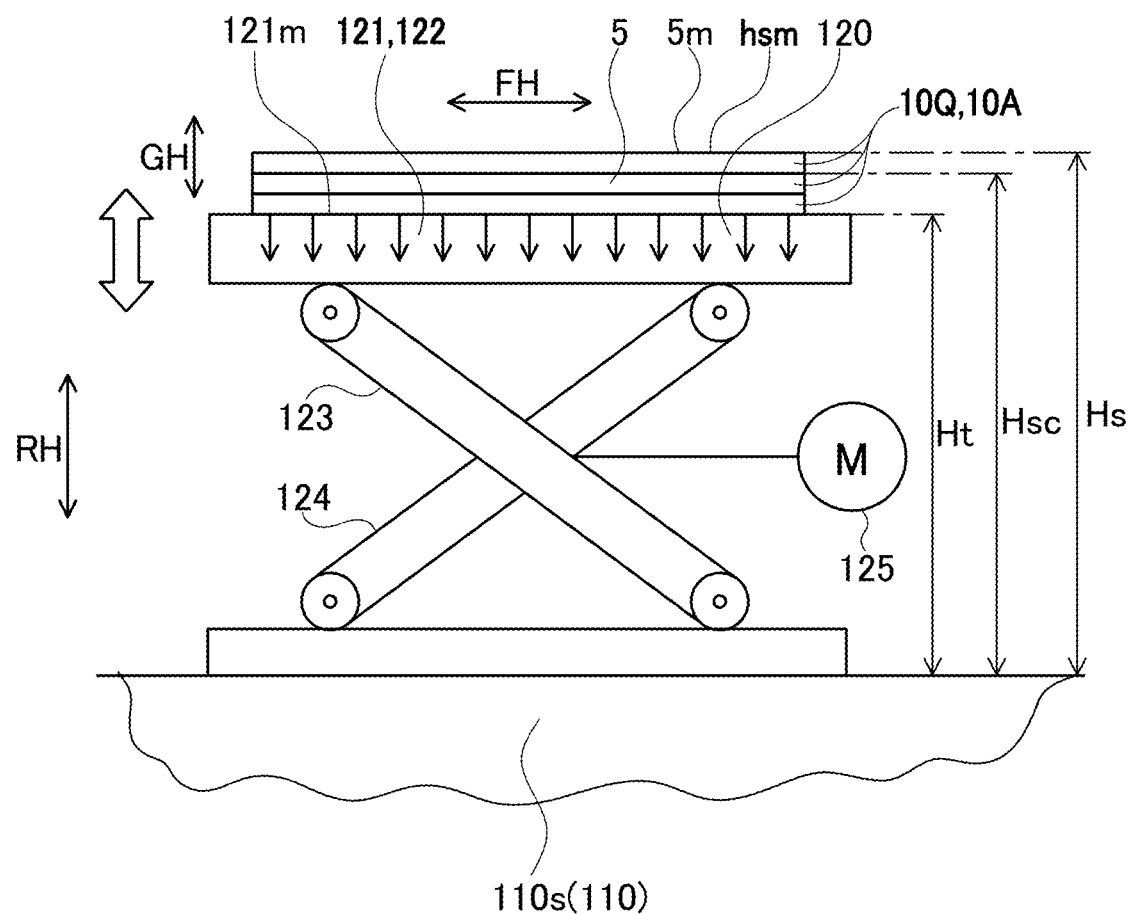
FIG. 4 is an explanatory view of a stacking table portion in the embodiment.

Herein, FIG. 4 shows a state of the stacking table portion 120 right after the post-placed laminated body 5 with the number of steps n of three are formed by stacking the workpieces 10 (the pre-placement workpiece 10P) for the third step on the post-placed laminated body 5 with the number of steps n of two. The radial height Hs of the object placement surface hsm of the post-placed laminated body 5 at this point is an addition of the radial height Hsc which has been adjusted in consideration of the height of the post-placed laminated body 5 with the number of steps n of two that is formed of two pieces of post-placed workpieces 10Q with a height of a newly stacked workpiece 10 (the unplaced workpiece 10P).

The workpiece transferring section 140 transfers the unplaced workpiece 10P which is to be placed on the object placement surface hsm by synchronizing its movement with rotation movement of the object placement surface hsm of the post-placed laminated body 5 and others at the workpiece transferring angular position θw.

Firstly, transferring of the unplaced workpiece 10P by the workpiece transferring section 140 is explained. The workpiece transferring section 140 includes a plurality of feeding rollers 141, an adsorption belt 143 which is provided with numerous suction holes and bridged over the feeding rollers 141, and a suction mechanism 144. The workpiece transferring section 140 feeds the unplaced workpiece 10P at a feeding speed V1 with adsorbing the unplaced workpiece 10P to the adsorption belt 143 by suction operation of the suction mechanism 144.

To be specific, while the unplaced workpiece 10P is placed on the adsorption belt 143 with its outer surface 10P*m* (a main surface which is not adsorbed by the adsorption belt 143) facing upward, the unplaced workpiece 10P is fed rightward in FIG. 3 at the feeding speed V1. Then, the adsorption belt 143 turns round by the feeding roller 141 to feed the unplaced workpiece 10P with its outer surface 10P*m* facing downward to a leftward direction in FIG. 3 at the feeding speed V1. This feeding speed V1 is made to be equal to the transferring speed V2 (the peripheral speed) (V1=V2) in a tangent direction of the object placement surface hsm of the post-placed laminated body 5 and others at the workpiece transferring angular position θw.

Further, the workpiece transferring section 140 is configured to cease the suction by the suction mechanism 144 when the transferred unplaced workpiece 10P has reached the workpiece transferring angular position θw. Accordingly, the unplaced workpiece 10P that has been sucked to the adsorption belt 143 from below is separated from the adsorption belt 143 at the workpiece transferring angular position θw.

Furthermore, arrangement (the placement position and the placement timing) of the unplaced workpiece 10P on the adsorption belt 143 is adjusted so as to synchronize the transferring timing of the unplaced workpiece 10P reaching the workpiece transferring angular position θw with the rotation timing of the stacking table portion 120, which is transferring this unplaced workpiece 10P, reaching the workpiece transferring angular position θw.

Therefore, as mentioned above, at the workpiece transferring angular position θw, the unplaced workpiece 10P can be moved and placed on the object placement surface hsm in synchronization with the rotation movement of the object placement surface hsm of the post-placed laminated body 5 and others. Namely, the unplaced workpiece 10P (which has been separated) is transferred on the object placement surface hsm of the post-placed laminated body 5 and others from the adsorption belt 143, so that the outer surface 10Pm of the unplaced workpiece 10P can be stacked or overlapped on the object placement surface hsm.

The adhesive agent applying section 160 is configured to apply the adhesive agent 41Z on the outer surface 10Pm of the unplaced workpiece 10P. Specifically, the adhesive agent applying section 160 is provided in the vicinity of the workpiece transferring section 140 to apply the adhesive agent 41Z to the outer surface 10Pm of the unplaced workpiece 10P which is being adsorbed to the adsorption belt 143 of the workpiece transferring section 140 and transferred leftward in FIG. 3 with its outer surface 10Pm facing downward.

The electrode body transferring section 170 includes a feeding belt (an electrode body receiving portion) 173 to receive the laminated electrode body 1 which has been completed with stacking of the workpieces 10 often steps. The electrode body transferring section 170 is to transfer and receive the laminated electrode body 1, which has been separated from the stacking table 120 at an electrode body transferring angular position θd at which the laminated electrode body 1 is transferred from the stacking table 120 as well as at a discharging timing Td of discharging the thus completed laminated electrode body 1, on the feeding belt 173 at an equal speed with the rotation movement of a radial outer top face 1m of the laminated electrode body 1.

Figure 6:
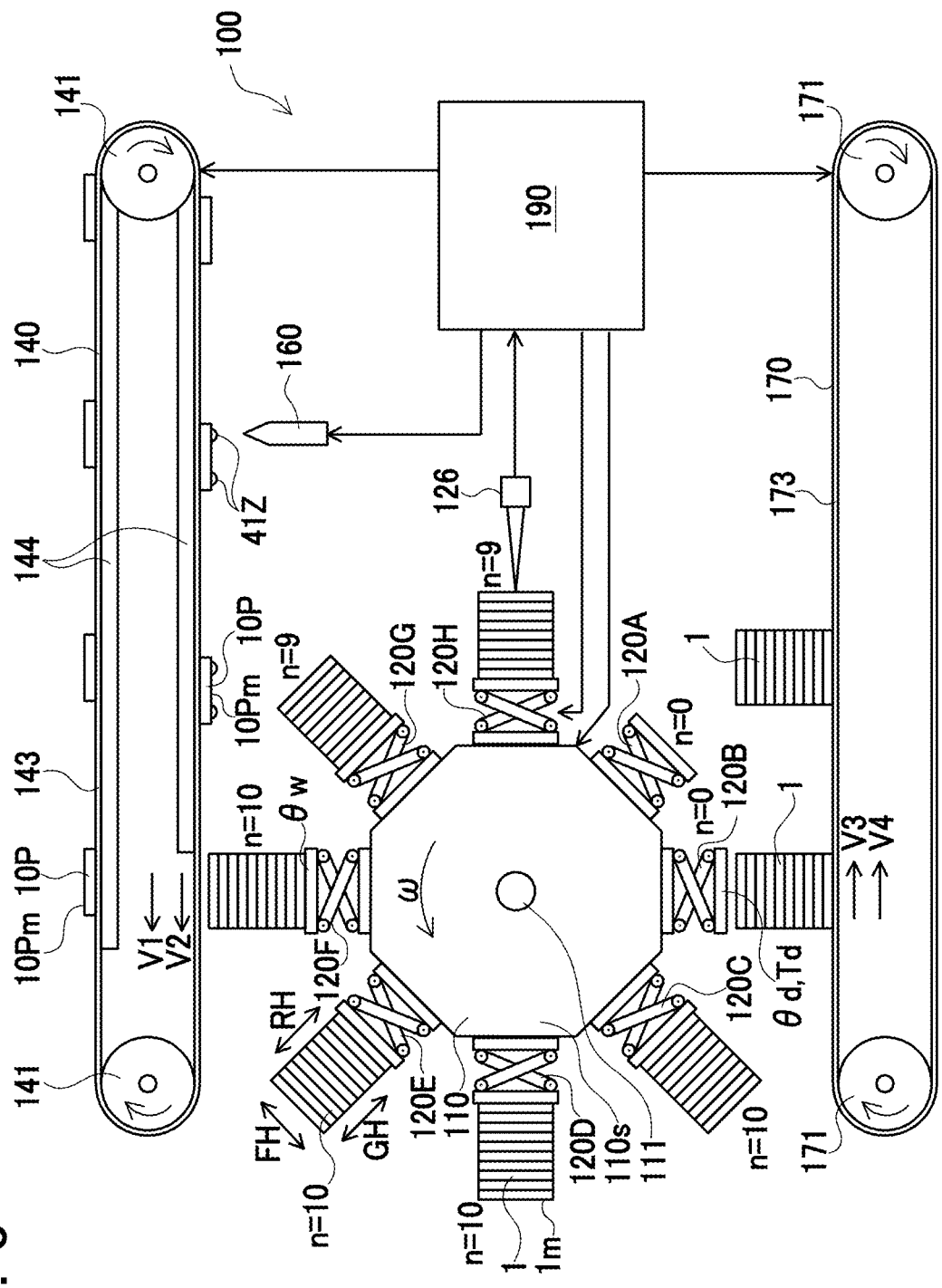
FIG. 6 is an explanatory view illustrating a state in which a completed laminated electrode body is transferred from a second stacking table portion in the embodiment.

To be more specific, the electrode body transferring section 170 includes a plurality of feeding rollers 171 and the feeding belt 173 bridged over these feeding rollers 171, and the electrode body transferring section 170 is configured to feed the laminated electrode body 1 placed on the feeding belt 173 at a feeding speed V4 (see FIG. 6). This feeding speed V4 is made to be equal to a moving speed V3 (a peripheral speed) in the tangent direction of the radial outer top face 1m of the laminated electrode body 1 at an electrode body transferring angular position θd.

On the other hand, the stacking table portion 120 is configured to stop the suction by the suction mechanism 122 of the adsorption table 121 to separate the laminated electrode body 1, which has been adsorbed to the adsorption table 121, from the adsorption table 121 and to place the (separated) laminated electrode body 1 on the feeding belt 173.

The controller 190 includes a CPU, an ROM, and an RAM which are not shown, and further includes a microcomputer which is to be operated by a predetermined control program stored in the ROM and others. This controller 190 is connected with a motor (not shown) for rotating the rotary base body 110, the servomotors 125 of the respective stacking table portions 120 (the first stacking table portion 120A to the eighth stacking table portion 120H), the feeding roller 141 of the workpiece transferring section 140, the adhesive agent applying section 160, and the feeding roller 171 of the electrode body transferring section 170, and the controller 190 controls these elements.

Figure 5:
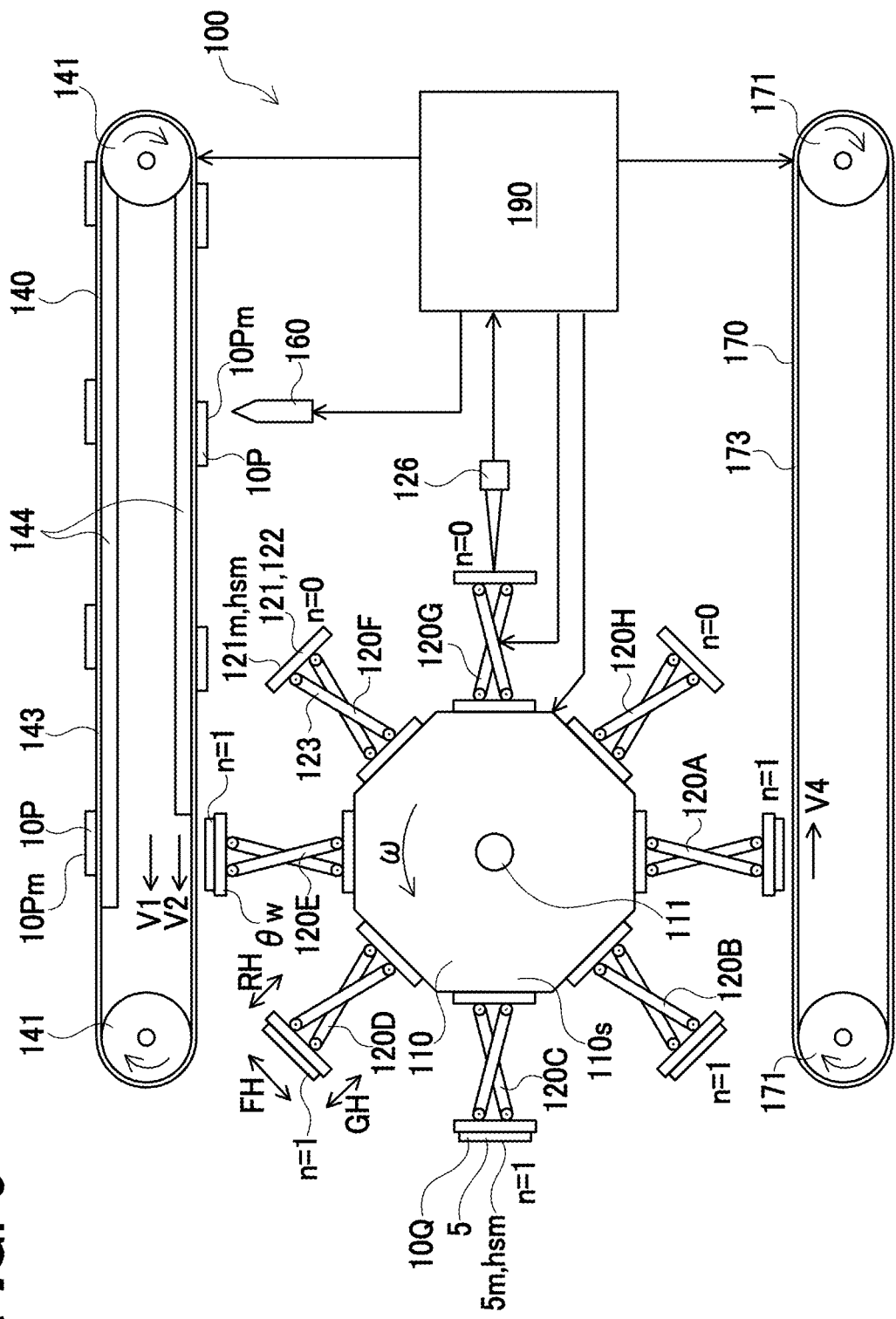
FIG. 5 is an explanatory view illustrating a state in which a pre-placement workpiece for a first step is transferred on a fifth stacking table portion in the embodiment.

Next, the workpiece transferring step S2 to the electrode body transferring step S4 performed by the above-mentioned electrode body producing apparatus 100 is explained (see FIG. 3 to FIG. 6). In the "workpiece transferring step S2," firstly, the workpiece transferring section 140 sequentially transfers the unplaced workpieces 10P formed of the first workpieces 10A (mono cell) for the first step on the object placement surface hsm as the table surface 121m of the respective staking table portions 120 (120A to 120H). In the present embodiment, the unplaced workpiece 10P for the first step is firstly transferred on the table surface 121m (the object placement surface hsm) of the first stacking table portion 120A, and then another one of the unplaced workpieces 10P is transferred on the table surface 121m (the object placement surface hsm) of the second stacking table portion 120B. In this manner, the unplaced workpieces 10P for the first step are sequentially transferred on the first stacking table portion 120A to the eighth stacking table portion 120H in this order. Herein, FIG. 5 illustrates a state in which the unplaced workpiece 10P for the first step is transferred on the fifth stacking table portion 120E to form the post-placed laminated body 5 with the number of steps n of one.

In this workpiece transferring step S2, the radial height Ht of the table surface 121m (the radial height Hs of the object placement surface hsm) is arranged to be the predetermined radial height Hsc (Ht=Hs=Hsc) by the above-mentioned height adjusting portion 123. Further, the feeding speed V1 of the unplaced workpiece 10P is equal to the moving speed V2 (the peripheral speed) in the tangent direction of the table surface 121m (the object placement surface hsm) at the workpiece transferring angular position θw. The unplaced workpiece 10P is therefore appropriately transferred on the table surface 121m (the object placement surface hsm).

Subsequently, the process proceeds to the determination step S3 (see FIG. 2) to determine whether the post-placed workpieces 10Q are stacked with the predetermined number (ten steps in the present embodiment) on the table surface 121m (to determine whether the laminated electrode body 1 with the number of steps n of ten is completed). Herein, at this moment, it is determined to be NO since the number of steps is still only one (n=1), and thus the workpiece transferring step S2 is performed again. Namely, in the second workpiece transferring step S2, the unplaced workpiece 10P for the second step formed of the first workpiece 10A (mono cell) is successively transferred on the radial outer surface 5m (the object placement surface hsm) of the post-placed laminated body 5 with the step number n of one.

To be more specific, the workpiece transferring section 140 transfers the unplaced workpiece 10P with its outer surface 10Pm facing downward. In the workpiece transferring step S2 for the second time and thereafter, the adhesive agent applying section 160 applies the adhesive agent 41Z on the outer surface 10Pm of the unplaced workpiece 10P during this transferring.

After that, the unplaced workpiece 10P which has been adsorbed on a lower side by the adsorption belt 143 is separated from the adsorption belt 143 at the workpiece transferring angular position θw and then placed on the radial outer surface 5m (the object placement surface hsm) of the post-placed laminated body 5 so that the outer surface 10Pm of the unplaced workpiece 10P applied with the adhesive agent 41Z is stacked or overlapped on the radial outer surface 5m (the object placement surface hsm) of the post-placed laminated body 5. Thus, this unplaced workpiece 10P is bonded to the post-placed laminated body 5 and integrated together.

Herein, also in the workpiece transferring step S2 for the second time and thereafter, the radial height Hs of the object placement surface hsm of the post-placed laminated body 5 is made to be equal to the predetermined radial height Hsc (Hs=Hsc). Further, the feeding speed V1 of the unplaced workpiece 10P is equal to the moving speed V2 (the peripheral speed) in the tangent direction of the object placement surface hsm of the post-placed laminated body 5 at the workpiece transferring angular position θw. Therefore, the unplaced workpiece 10P can be appropriately placed on the object placement surface hsm of the post-placed laminated body 5.

Subsequently, the process proceeds to the determination step S3 (see FIG. 2) to determine whether a predetermined number (ten steps) of the post-placed workpieces 10Q have been stacked on the table surface 121m (whether the laminated electrode body 1 with the number of steps n of ten has been completed). At this point, it is determined to be NO since the number of steps is still two (n=2), and thus the workpiece transferring step S2 is repeated again. The workpiece transferring step S2 is thus repeated until the number of steps n reaches ten.

In the workpiece transferring step S2 for the tenth time, however, instead of the first workpiece 10A, the unplaced workpiece 10P for the tenth step formed of the second workpiece 10B (the negative electrode plate provided with the separator) is successively transferred on the object placement surface hsm of the ninth post-placed laminated body 5 with the number of steps n of nine.

When the post-placed workpieces 10Q reach ten steps and the laminated electrode body 1 with the number of steps n of ten is completed, it is determined to be YES in the determination step S3, and the process proceeds to the electrode body transferring step S4.

In the "electrode body transferring step S4," at the electrode body transferring angular position θd and also at the discharging timing Td when the laminated electrode body 1 has reached the electrode body transferring angular position θd for the first time after its completion, the electrode body transferring section 170 sequentially transfers the completed laminated electrode body 1 onto the feeding belt 173 from the stacking table portions 120. FIG. 6 illustrates a state in which the laminated electrode body 1 is being transferred on the feeding belt 173 from the second stacking table portion 120B.

Specifically, at the electrode body transferring angular position θd, the suction mechanism 122 releases the suction of the adsorption table 121 to separate the laminated electrode body 1 that has been adsorbed to the table surface 121m from the table surface 121m and to place the laminated electrode body 1 on the feeding belt 173. At this time, the moving speed (the feeding speed V4) of the feeding belt 173 is equal to the moving speed V3 (the peripheral speed) in the tangent direction of the radial outer top face 1m of the laminated electrode body 1 at the electrode body transferring angular position θd. In this manner, the laminated electrode body 1 can be smoothly transferred on the feeding belt 173 with less impact.

After that, the laminated electrode body 1 placed on the feeding belt 173 is fed rightward in FIG. 6 and discharged outside the apparatus. This discharging operation is performed sequentially from the first stacking table portion 120A to the eighth stacking table portion 120H so that all (eight of) the laminated electrode bodies 1 are discharged outside the apparatus. Thus, the laminated electrode body 1 shown in FIG. 1 is obtained. Then, the process returns to the workpiece transferring step S2 again, and thus eight pieces of the laminated electrode bodies 1 can be serially and intermittently produced.

As explained above, the electrode body producing apparatus 100 is provided on the outer peripheral edge portion 110s of the rotary base body 110 with a plurality of the stacking table portions 120 (120A to 120H). Each of the stacking table portions 120 includes the height adjusting portion 123 to adjust or change the radial height Ht of the table surface 121m, and the height adjusting portion 123 changes the radial height Ht of the table surface 121m at the workpiece transferring angular position θw such that the radial height Hs of the object placement surface hsm of the post-placed laminated body 5 and others becomes the predetermined radial height Hsc. Thereby, the unplaced workpiece 10P can be placed one by one on the stacking table portion 120 from the workpiece transferring section 140 at every one rotation of the rotary base body 110, so that the laminated electrode bodies 1 each formed of a predetermined number (ten steps in the present embodiment) of the post-placed workpieces 10Q can be easily formed by a predetermined times of rotation (rotation of 10 times in the present embodiment) of the rotary base body 110.

Furthermore, in the electrode body producing apparatus 1, the unplaced workpiece 10P is being moved and placed on the object placement surface hsm in synchronization with the rotation movement of the object placement surface hsm of the post-placed laminated body 5 and others at the workpiece transferring angular position θw, and thus the unplaced workpieces 10P can be appropriately stacked on the stacking table portion 120 and the laminated electrode body 1 can be appropriately produced.

Moreover, the electrode body producing apparatus 100 is further provided with the electrode body transferring section 170 including the feeding belt 173 to move and receive the laminated electrode body 1, which has been separated from the stacking table portion 120 at the electrode body transferring angular position θd and at the discharging timing Td on the feeding belt 173 at the speed equal to the rotation movement of the radial outer top face 1m of the laminated electrode body 1. This configuration achieves smooth transferring of the laminated electrode body 1 onto the feeding belt 173 with less impact and appropriate discharging of the laminated electrode body 1 outside the apparatus.

The present disclosure has been explained according to the embodiment mentioned above, but the present disclosure is not limited to the embodiment and may be applied with any modifications in an appropriate manner without departing from the scope of the disclosure.

For example, in the height adjusting portion 123 of the stacking table portion 120 according to the embodiment, the height detection sensor 126 actually detects the radial height Hs of the object placement surface hsm of the post-placed laminated body 5 and others and the height adjusting portion 123 changes the radial height Hs of the object placement surface hsm based on this height information. However, the configuration is not limited to this. Alternatively, the radial height Hs may be changed by the predetermined program since the radial height Hs of the object placement surface hsm is increased by a height of the newly stacked post-placed workpiece 10Q at every one rotation of the rotary base body 110.

Further, in the workpiece transferring section 140 of the present embodiment, the unplaced workpiece 10P is transferred to the workpiece transferring angular position θw, where the unplaced workpiece 10P is to be transferred on the stacking table portion 120, by the adsorption belt 143 that is bridged over the feeding rollers 141. However, the configuration is not limited to this. Alternatively, a roller (not shown) may be used instead of the feeding rollers 141 and the adsorption belt 143 to adsorb the unplaced workpiece 10P on a roller surface of this roller, and the unplaced workpiece 10P may be fed to the workpiece transferring angular position θw by rotation of this roller.

Further, the embodiment exemplifies the rotary base body 110 rotating at a constant speed (a constant angular velocity). This rotation at a constant speed achieves reduction in increase or decrease in the rotational energy of the rotary base body 110. Alternatively, the rotation speed of the rotary base body 110 may be appropriately changed. For example, the rotation speed at the timing of stacking the unplaced workpiece 10P on the stacking table portion 120 and the rotation speed at the timing of transferring (discharging) the completed laminated electrode body 1 from the stacking table portion 120 to the electrode body transferring section 170 may be differentiated. To be specific, the rotation speed at the timing of discharging the laminated electrode body 1 from the stacking table portion 120 may be relatively low as compared with the rotation speed of the rotary base body 110 at the timing of placing the unplaced workpiece 10P on the stacking table portion 120. Thus, it is preferable that the laminated electrode body 1 is assuredly transferred (discharged) from the stacking table portion 120 to the electrode transferring section 170.

Other than that, of the unplaced workpieces 10P, when the unplaced workpiece 10P for a first step is to be placed on the stacking table portion 120, the rotation speed is made to be relatively high since this unplaced workpiece 10P has only to be adsorbed to the stacking table portion 120. On the other hand, when the unplaced workpieces 10P for the second and the following steps are to be stacked on the post-placed laminated body 5, the unplaced workpieces 10P needs to not only be placed on but also be bonded to the post-placed laminated body 5 that has been stacked on the stacking table portion 120. The rotation speed of the rotary base body 110 is thus considered to be made relatively low. Further, the more the steps of the post-placed laminated body 5 having been stacked on the stacking table portion 120 increase, the more the stacking operation needs to be performed carefully, and accordingly, the rotation speed of the rotary base body 10 may be considered to be made relatively low.

REFERENCE SIGNS LIST

1 Laminated electrode body
1m Radial outer top face (of the laminated electrode body)
5 Post-placed laminated body
5m Radial outer surface (of the post-placed laminated body)
hsm Object placement surface
10 Workpiece
10P Unplaced workpiece
10A First workpiece (mono cell)
10B Second workpiece (negative electrode plate provided with a separator)
11 Positive electrode plate (electrode plate)
21 Negative electrode plate (electrode plate)
31 Separator
100 Electrode body producing apparatus
110 Rotary base body
110s Outer peripheral edge portion
111 Rotary shaft
120 Stacking table portion
120A to 120H First to eighth stacking table portions
121 Adsorption table
121m Table surface
123 Height adjusting portion
140 Workpiece transferring section
170 Electrode body transferring section
173 Feeding belt (electrode body receiving portion)
190 Controller
Ht Radial height (of the table surface)
Hs Radial height (of the object placement surface)
Hsc (Predetermined) radial height
θw Workpiece transferring angular position
θd Electrode body transferring angular position
Td Discharging timing

What is claimed is:

1. An electrode body producing apparatus configured to produce a laminated electrode body formed by stacking a plurality of workpieces, the electrode body producing apparatus comprising:
    a rotary base body of a cylindrical shape configured to rotate about a rotary axis;
    a plurality of stacking table portions provided on an outer peripheral edge portion of the rotary base body to rotate and move with the rotary base body;
    a workpiece transferring section configured to transfer and place an unplaced workpiece onto an object placement surface of any one of a table surface of the respective stacking table portions and a radial outer surface of a post-placed laminated body which is held by the table surface, the unplaced workpiece being an unstacked workpiece, and the post-placed laminated body including one or more workpieces that have been placed on the table surface;
    a controller; and
    an electrode body transferring section configured to transfer the laminated electrode body, which has been completed, from the plurality of stacking table portions,
wherein
    the object placement surface is arranged parallel to a rotary direction of the rotary base body,
    each of the plurality of stacking table portions comprises a height adjusting portion configured to change a radial height of the table surface,
    the height adjusting portion is configured, at least at a workpiece transferring angular position on which the unplaced workpiece is transferred from the workpiece transferring section to the object placement surface, to change the radial height of the table surface such that a radial height of the object placement surface becomes a predetermined radial height,
    the workpiece transferring section is configured to transfer and place the unplaced workpiece onto the object placement surface in synchronization with rotation movement of the object placement surface at the workpiece transferring angular position,
    the electrode body transferring section comprises an electrode body receiving portion configured to receive the laminated electrode body which has been separated from a corresponding stacking table portion of the plurality of stacking table portions, and
    the controller is configured to control the electrode body transferring section to receive and transfer the laminated electrode body at an equal speed with rotation movement of a radial outer top face of the laminated electrode body at an electrode body transferring angular position on which the laminated electrode body is transferred from the corresponding stacking table portion to the electrode body receiving portion as well as at a discharging timing of discharging the laminated electrode body.

2. The electrode body producing apparatus according to claim 1, wherein
    the workpiece transferring section is configured to stack the unplaced workpiece onto the radial outer surface of the post-placed laminated body which is held by the table surface in a direction perpendicular to the table surface while the plurality of stacking table portions is rotated and moved with the rotary base body.

3. The electrode body producing apparatus according to claim 1, wherein
the workpiece transferring section includes a surface configured to hold the unplaced workpiece, and
the workpiece transferring section is configured to transfer and place the unplaced workpiece onto the object placement surface when the surface of the workpiece transferring section is parallel to the object placement surface.

4. The electrode body producing apparatus according to claim 2, wherein
the workpiece transferring section includes a surface configured to hold the unplaced workpiece, and
the workpiece transferring section is configured to transfer and place the unplaced workpiece onto the object placement surface when the surface of the workpiece transferring section is parallel to the object placement surface.

5. The electrode body producing apparatus according to claim 1, wherein
the object placement surface is parallel to the outer peripheral edge portion of the rotary base body.

6. The electrode body producing apparatus according to claim 1, wherein
the object placement surface faces an outer side of the rotary base body in a radial direction of the rotary base body and is configured to rotate, as a flat contact surface for the unplaced workpiece or the post-placed laminated body, coaxially with the rotary base body.

* * * * *